United States Patent
Ronconi

(10) Patent No.: US 11,014,763 B2
(45) Date of Patent: May 25, 2021

(54) FORMING DEVICE FOR FORMING A LAYER OF CONTAINERS ARRANGED AS A QUINCUNX

(71) Applicant: EMS GROUP S.R.L., Montecchio Emilia (IT)

(72) Inventor: Giovanni Ronconi, Montecchio Emilia (IT)

(73) Assignee: EMS GROUP S.P.A., Montecchio Emilia (IT)

( * ) Notice: Subject to any disclaimer, the term of this patent is extended or adjusted under 35 U.S.C. 154(b) by 0 days.

(21) Appl. No.: 16/619,714

(22) PCT Filed: Jun. 1, 2018

(86) PCT No.: PCT/IB2018/053951
§ 371 (c)(1),
(2) Date: Dec. 5, 2019

(87) PCT Pub. No.: WO2018/224934
PCT Pub. Date: Dec. 13, 2018

(65) Prior Publication Data
US 2020/0180871 A1 Jun. 11, 2020

(30) Foreign Application Priority Data
Jun. 5, 2017 (IT) .......................... 102017000061278

(51) Int. Cl.
*B65G 47/08* (2006.01)
*B65G 47/82* (2006.01)
(Continued)

(52) U.S. Cl.
CPC ............ *B65G 47/088* (2013.01); *B65B 21/06* (2013.01); *B65G 47/82* (2013.01);
(Continued)

(58) Field of Classification Search
None
See application file for complete search history.

(56) References Cited

U.S. PATENT DOCUMENTS

| 2,571,790 A | 10/1951 | Tomkins et al. | |
| 2,949,179 A * | 8/1960 | Busse | B65G 57/005 198/418.1 |

(Continued)

FOREIGN PATENT DOCUMENTS

JP H01303223 A 12/1989

OTHER PUBLICATIONS

International Search Report dated Sep. 10, 2018 from counterpart PCT App No. PCT/IB2018/053951.
(Continued)

*Primary Examiner* — Kavel Singh
(74) *Attorney, Agent, or Firm* — Shuttleworth & Ingersoll, PLC; Timothy J. Klima

(57) ABSTRACT

Forming device for forming a layer of containers arranged as a quincunx which includes a conveyor belt configured to advance said containers according to a feeding direction X of the conveyor belt, an equipment piece bearing a plurality of partitions positioned parallel to said direction X, wherein said partitions divide the upper surface of the conveyor belt into a plurality of channels, each having a width such to allow the passage of a single row of containers, characterized in that the equipment piece further includes a series of feeding devices configured for dosing and releasing, in a controlled manner, the containers exiting from the channels, each placed at the outlet of each channel, and said equipment piece is movable according to direction Y substantially perpendicular to the feeding direction X of the conveyor belt.

13 Claims, 4 Drawing Sheets

(51) Int. Cl.
    *B65G 23/06*     (2006.01)
    *B65B 21/06*     (2006.01)

(52) U.S. Cl.
    CPC ........... *B65G 2201/0244* (2013.01); *B65G 2203/042* (2013.01); *B65G 2811/0615* (2013.01)

(56) References Cited

U.S. PATENT DOCUMENTS

| | | | | |
|---|---|---|---|---|
| 3,522,890 | A * | 8/1970 | Birchall | B65G 57/005 414/789.5 |
| 3,978,970 | A * | 9/1976 | Reimers | B65G 47/088 414/789.5 |
| 4,162,016 | A * | 7/1979 | Schmitt | B65G 57/035 414/794.3 |
| 4,603,896 | A * | 8/1986 | Vasseur | B65G 47/90 294/119.1 |
| 5,074,744 | A * | 12/1991 | Mastak | B65G 47/088 414/791.7 |
| 5,080,551 | A | 1/1992 | Jerred | |
| 6,805,230 | B2 * | 10/2004 | Correggi | B65G 47/088 198/427 |
| 2004/0000464 | A1 | 1/2004 | Busse | |
| 2010/0326015 | A1 | 12/2010 | Miller et al. | |

OTHER PUBLICATIONS

International Preliminary Report on Patentability dated Aug. 16, 2019 from counterpart PCT App No. PCT/IB2018/053951 and Response filed by Applicant on Jul. 8, 2019.

* cited by examiner

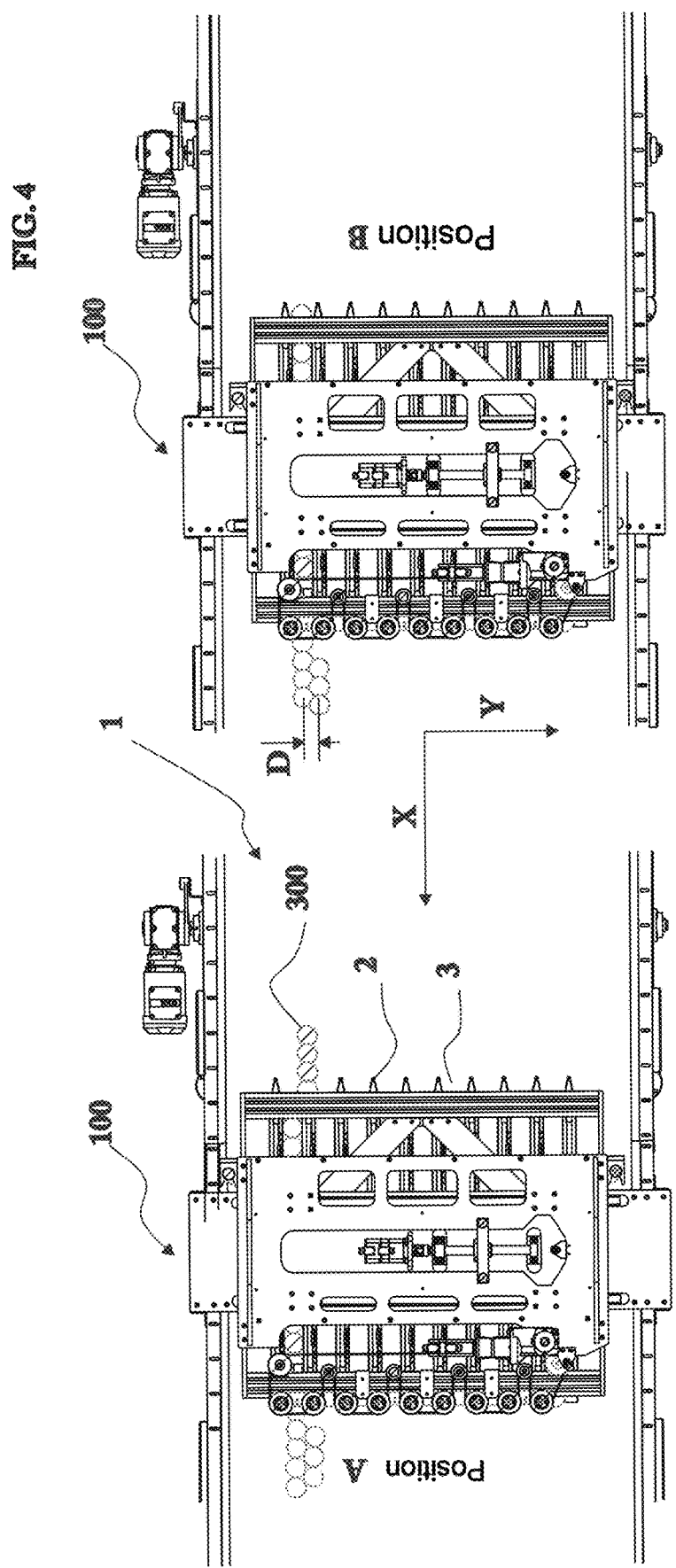

FORMING DEVICE FOR FORMING A LAYER OF CONTAINERS ARRANGED AS A QUINCUNX

This application is the National Phase of International Application PCT/IB2018/053951 filed Jun. 1, 2018 which designated the U.S.

This application claims priority to Italian Patent Application No. 102017000061278 filed Jun. 5, 2017, which application is incorporated by reference herein.

FIELD OF APPLICATION OF THE INVENTION

The present invention is inserted in the field of equipment pieces for organizing containers, preferably circular containers, according to a honeycomb arrangement, also termed a quincunx in technical language.

STATE OF THE ART

Empty or full containers, such as cans, bottles, vessels made of materials such as tinplate, aluminum alloys, plastic or glass, are generally stored and transported onto pallets before the possible filing or before the final packaging, if they are already full.

The arrangement of said containers on pallets occurs by means of machines termed palletizing machines, which perform the function of superimposing layers of containers on each other, such layers generally separated by a cardboard or plastic sheet that allows and improves the stability thereof.

In order to further improve the stability of the pallet, so that each layer contains the highest number of containers, the latter are generally arranged in beehive or honeycomb arrangement. Hereinbelow, this will be termed quincunx arrangement. With the term quincunx, it is intended an arrangement which provides that the containers be arranged on parallel rows, and each row is flanked by a row offset by one pitch equal to the radius of the container itself. In such a manner, the first, the third, the fifth, etc., i.e. the odd rows, will all be equal to each other, while the second, the fourth, the sixth, etc., i.e. the even rows, will all be equal to each other and offset by one pitch with respect to the odd rows; said pitch is equal to the radius of the container.

The quincunx configuration also provides for two possible variants as a function of the number of bottles present in each row:
1. The even rows and the odd rows contain the same number of containers,
2. The even rows contain one more container than the number of containers of the odd rows or vice versa.

The quincunx configuration is typical of containers with circular section, but it is also often used for optimizing the arrangement of containers with elliptical section or the like.

The need to arrange the containers as a quincunx is not only functional with the formation of layers for a pallet, but it is also used for optimizing the so-called secondary packaging of the containers in packages such as boxes, trays or bundles.

The arrangement of the containers generally occurs on conveyor belts positioned upstream of the palletizing machine or of the packaging machine.

A method is known in the state of the art that provides for arranging containers as a quincunx by means of spontaneous formation.

Said method provides for accumulating, on a conveyor belt, the containers coming from one or more feed conveyors. The conveyor belt comprises, parallel to the product feeding sense, two opposite lateral guides that are spaced substantially the same as the width of the layer itself to be formed. A generally-shaped abutment element is placed transversely and at the bottom of the belt, adapted to receive the containers in abutment.

Said containers retained by the lateral guides advance, coming into abutment against the shaped abutment element and, being progressively set against each other, are spontaneously arranged in quincunx configuration.

The limit of the spontaneous formation is due to the fact that it does not ensure the complete filling of the layer; rather, empty spaces can be present where containers are lacking.

The fact of being unable to ensure the maximum number of containers on the pallet affects the storage and movement costs, in addition to negatively affecting the speed/frequency of the palletizing or packaging line. This often involves the need to have, on said machines, an operator who controls and intervenes to manually correct the formation of the layer, which is particularly difficult on the palletizing lines where the speeds/frequencies are high.

Other methods for forming layers of containers arranged as a quincunx are reported in the U.S. Pat. Nos. 2,571,790, 2,949,179, 5,080,551, US2010326015.

In all these patents, it is sought to optimize the formation in order to limit the spaces left empty by the incorrect positioning of the containers.

For example, the U.S. Pat. No. 5,080,551 provides for an apparatus comprising a plurality of spaced separators which are extended in the feeding direction of the conveyor belt on which the containers are conveyed; said separators divide the upper surface of the conveyor into a plurality of lanes, each having a width slightly greater than the diameter of the container. A pair of parallel central separators defining a central lane is flanked on both sides by a plurality of outer separators; said outer separators have respective upstream portions that are extended parallel to the central separators and respective downstream portions that are curved. In other words, the downstream ends of the outer separators are aligned in order to form an acute angle with respect to the longitudinal axis of the conveyor and hence define lanes which have respective outlets that face towards the interior or towards the central axis of the conveyor.

When the containers are conveyed along the lanes formed by the separators, the central separators form a rectilinear central row of containers, while the outer separators progressively direct the containers towards the central row in a manner such that the containers are arranged as a quincunx against the previously-formed rows, forming successive rows on both sides of the central row.

Said solution, as with other solutions described in the abovementioned patents, are not sufficiently effective for ensuring the reliability of the correct quincunx formation of layers of containers.

In addition to that described in the aforesaid patents, it does not allow forming quincunx layers according to the configuration identified at point 2, in which the even rows contain one container more than the number of containers of the odd rows or vice versa.

This is an important limit, since as a function of the size of the container and of the size of the pallet on which the layer is arranged, the configuration 2 can allow positioning a greater number of containers per layer and consequently storing and/or transporting, in the same size volume, a greater number of containers.

In order to remedy this problem, additional complex equipment pieces are often necessary, which pick up the excess containers and place them back in circulation. This recovery system comes to further negatively affect the speed/frequency of the palletizing or packaging system.

With the variation of the size of the container to be processed on the line, it is necessary to perform the so-called size change. All the methods and apparatuses described in the abovementioned patents involve a difficult size change in terms of time as well as complexity of equipment pieces to be substituted or repositioned, due for example to the high number of channels on which it is necessary to intervene.

DESCRIPTION AND ADVANTAGES OF THE INVENTION

The technical problem underlying the present invention is to provide the art with a device for forming a layer of containers arranged as a quincunx that is structurally and functionally conceived for overcoming one or more of the limits described above with reference to the abovementioned prior art.

In the scope of the aforesaid problem, a main object of the invention is to implement a device for forming a layer of containers arranged as a quincunx that allows ensuring a formation without empty spaces between the containers of the layer, i.e. without missing containers.

Another object of the present invention is to allow the formation of a layer of containers arranged as a quincunx according to the two different possible variants of said quincunx formation. It is thus possible to select the configuration in which the even rows and the odd rows contain the same number of containers, or the configuration in which the even rows contain one more container with respect to the number of containers of the odd rows or vice versa.

Further object of the invention is also that of providing the art with a device for forming a layer of containers arranged as a quincunx in the scope of a simple rational solution with rather limited costs.

These and other objects are achieved due to the characteristics disclosed herein. The disclosure preferred and/or particularly advantageous aspects of the invention.

In particular, one embodiment of the present invention provides a device for forming a layer of containers arranged as a quincunx, in which a plurality of partitions are mounted on a conveyor belt on which the containers advance. Said partitions are positioned parallel to the feeding direction of the conveyor, dividing its upper surface into a plurality of channels each having a width slightly greater than the diameter of the container.

According to a preferred embodiment, at the outlet of each channel a feeding device is mounted, preferably of rotary type, bearing a plurality of pockets configured to enclose a container portion. The partitions and hence the channels are configured for being moved according to a direction perpendicular to the feeding direction of the conveyor belt, between two positions defined as a function of the size of the container.

In one embodiment, the channels move in reciprocating manner into the first and into the second position and the feeding device with pockets rotates by one pitch, making a container exit each time one of said positions is reached.

Due to the feeding device of the device for forming a layer of containers arranged as a quincunx according to the present invention, it is possible to control the number of containers exiting from each channel, ensuring the presence of all the containers of the layer.

The feeding device with rotary pockets is capable of detecting a possible fallen container, preventing the exit thereof and hence the subsequent breaking up of the layer.

Another aspect of the invention is to make the size change quick and simple, such size change being necessary with the change of size of the container; indeed, a structure is provided that is fixed to the conveyor belt on which the means are installed which move the partitions and the feeding devices with rotary pockets; on said structure, preferably by means of quick coupling and release elements, a single equipment piece is installed, comprising the partitions and the feeding devices; said equipment piece is substituted with the variation of the size of the container.

The equipment piece in fact has limited size and weight due to the transverse movement of the partitions; the number of channels is not equal to the number of rows of containers which form the layer, but substantially equal to half of said rows.

In addition, among the advantages of the invention, it is underlined that it is possible to manage, for a given container, all the variations of quincunx formation of the layer without carrying out mechanical size changes, without providing for additional equipment pieces and without negatively affecting the speed/frequency of the line. Furthermore, it is possible to create layers with parallel rows, i.e. without quincunx, where all the rows of containers are equal to each other and not offset.

Indeed, according to a further aspect of the invention, a programmable control unit allows managing, in a correlated manner, the means which handle/move the feeding devices with rotary pockets and the means which handle/move the partitions.

Due to the use of the programmable control unit and to the use preferably of brushless motors, it is possible to attain high production speeds/frequencies.

A further advantage of the invention is due to the translating movement of the partitions, orthogonal to the flow of the containers; said movement reduces the risk of lack of filling of the channels due to possible obstructions at the entrance to the partitions themselves. It therefore performs the function which in technical jargon is termed "shuffling" and avoids the installation of equipment pieces specific for said purpose.

Another object of the present invention is that of providing a method for forming a layer 200 of containers 300 arranged as a quincunx.

BRIEF DESCRIPTION OF THE FIGURES

This and other characteristics will be more evident from the following description of several embodiments illustrated, merely by way of a non-limiting example, in the enclosed drawing tables.

FIG. 4: illustrates the forming device for forming a layer of containers arranged as a quincunx with equipment piece movable in the two work positions.

DESCRIPTION OF THE INVENTION

Figure 1:
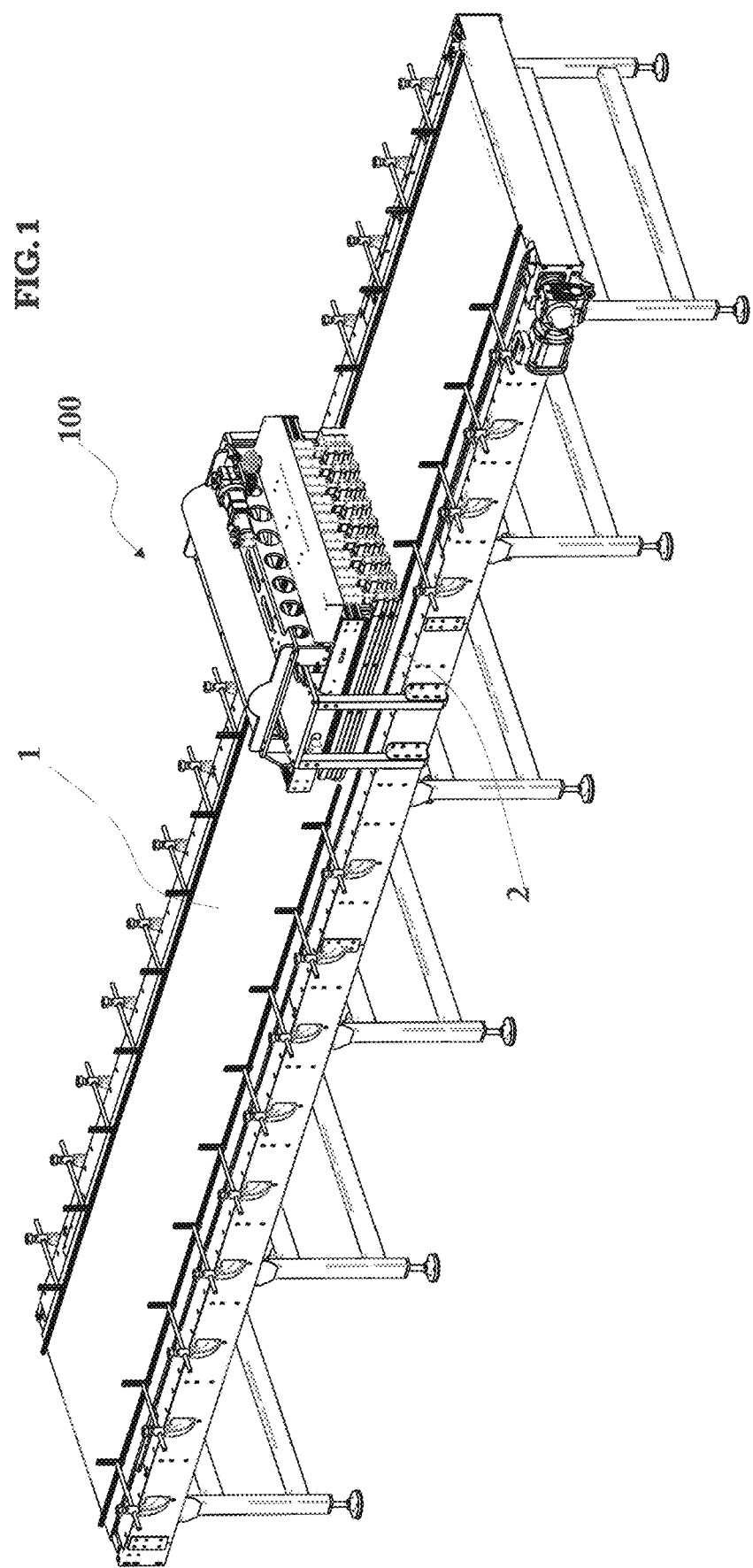
FIG. 1: illustrates, in axonometric view, a conveyor belt on which the device is installed for forming a layer of containers arranged as a quincunx.

With particular reference to FIG. 1, a forming device 100 for forming a layer 200 of containers 300 arranged as a quincunx, object of the present invention, is represented.

The containers 300, coming from a feed line, are accumulated on a conveyor belt 1, on which they advance according to direction X.

The forming device 100 comprises a fixed structure 8, placed above the conveyor belt 1.

In a preferred embodiment, the fixed structure 8 is mechanically connected to the structure of the conveyor belt 1, as represented in FIG. 1.

Said structure 8 in a second embodiment, not represented in the figure, can also be directly fixed to the ground and not to the conveyor belt 1.

The conveyor belt 1 is preferably provided with lateral containment guides, both at the inlet to the forming device 100 and at the outlet of the same.

The forming device 100 further comprises an equipment piece 9 on which a plurality of partitions 2 are mounted. Said partitions 2 are positioned parallel to the feeding direction X of the conveyor belt 1 and divide the upper surface thereof into a plurality of channels 3.

Each channel 3 has a width such to allow the passage and hence the feeding of a single row of containers 300.

In a preferred embodiment, the length of the partitions is sufficiently long to contain at least one container 300 more than the number of containers 300 that compose the longest row of the layer 200 to be formed.

It is in any case intended that that described above has exemplifying and non-limiting value, therefore possible variations are contemplated which provide for partitions of smaller length than the row of the layer 200 to be formed.

The equipment piece 9 is movable according to direction Y substantially perpendicular to the feeding direction X of the conveyor belt.

In such a manner, the partitions 2 and thus the channels 3, integral with the equipment piece 9, can translate the rows of containers 300 along the direction Y.

The equipment piece 9 is moved along the direction Y in a reciprocating manner between a first and a second position, indicated in FIG. 4 with letters A and B.

As represented in FIG. 4, the distance D between the two positions A and B is equal to the distance between the axes of two adjacent rows of containers 300 of the layer 200.

Said distance D is thus a function of the diameter and of the shape of the container 300.

The portion of the partitions 2 at the inlet of the containers 300 is preferably tip-shaped or comprises rolling elements which facilitate the insertion of the containers 300 in the channels 3.

At the outlet of each channel 3, a feeding device 4 is present that is configured for releasing—in a controlled manner and according to modes that will be illustrated in more detail below—the containers 300 exiting from the channels 3.

Each feeding device 4 is mounted integral with the equipment piece 9 and is configured to rotate, each according to an axis Z thereof orthogonal to the directions X and Y.

According to a preferred embodiment, the feeding device 4 bears a plurality of pockets 5 configured to enclose and retain a container portion 300.

Preferably, said pockets 5 are distributed at constant pitch on a circumference whose axis coincides with the rotation axis Z.

The forming device 100 further comprises handling means 6 configured to set in rotation the feeding devices 4.

When the feeding device 4 rotates by one pitch, equal to the angular distance between two successive pockets 5, a container 300 is expelled from the corresponding channel 3.

The rotation of said feeding device 4 is coordinated with the movement of the equipment piece 9; indeed, the feeding device 4 makes the container 300 exit from the channel 3 only when the channel 3 is in the position A or B, maintaining it locked during the step of translating between the two positions.

Figure 2:
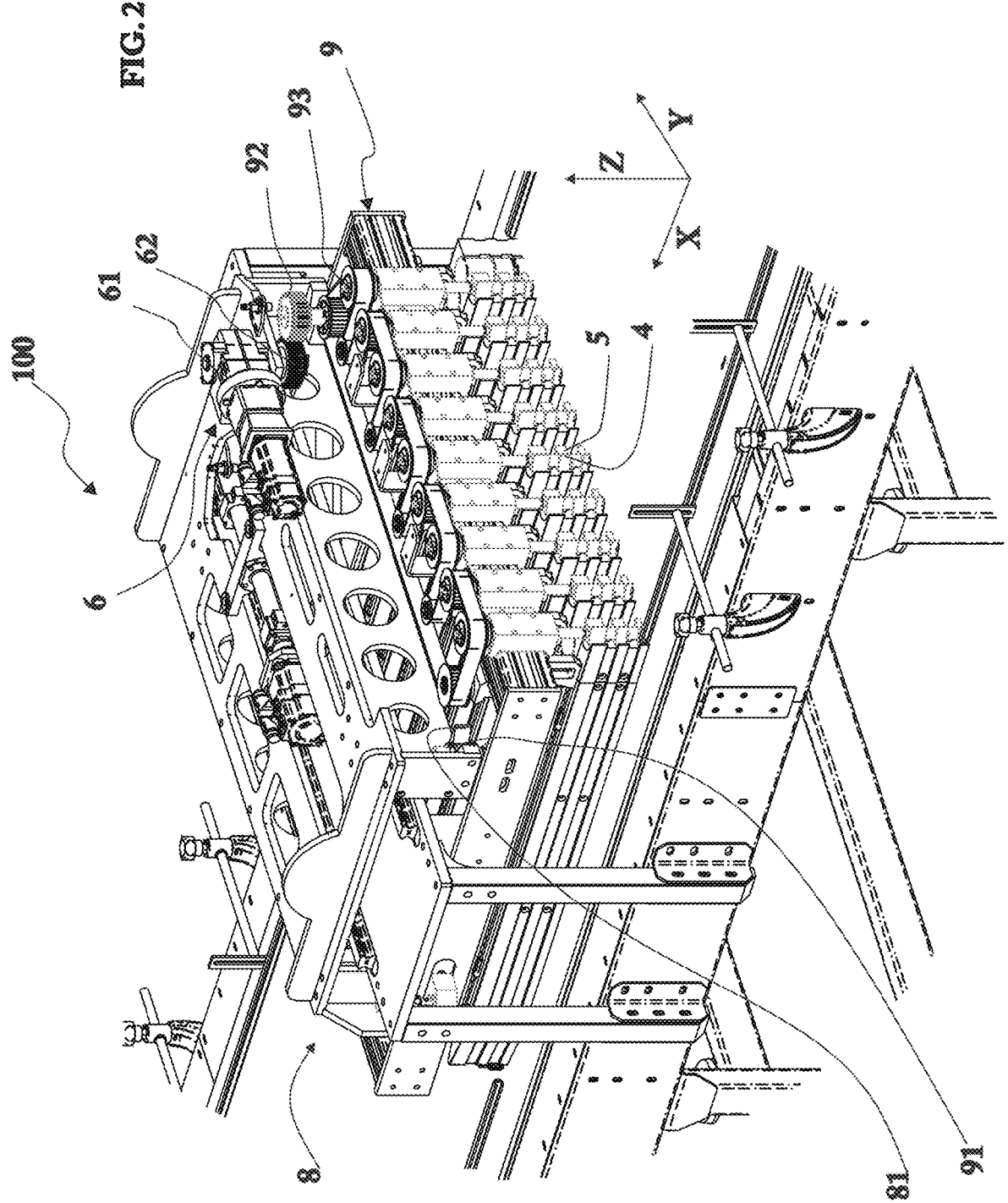
FIG. 2: illustrates a detail of the handling means of the channels and of the feeding devices.

In a preferred embodiment represented in FIG. 2, the handling means 6 comprise at least one motor 61 and transmission elements 62 mechanically integral with the fixed structure 8. The motor 61 is preferably a gear motor.

The equipment piece 9 comprises connection elements 92 configured to receive motion from the transmission elements 62, when the equipment piece 9 is fastened to the structure 8; transmission elements 93, integral with the equipment piece 9, are configured to transmit motion from the connection elements 92 to all the feeding devices 4.

Indeed said transmission means 93 preferably comprise at least one belt and a plurality of pulleys which move, in a synchronized manner, all the feeding devices 4 actuated by the single motor 61.

In accordance with possible embodiments, the feeding devices 4 can be driven by two or more motors 61; consequently, each motor 61 is coupled to a transmission element 62 and the respective connection element 92 is subsequently coupled thereto; the transmission means 93 are only dedicated to moving the feeding devices 4 driven by the respective motor 61.

In accordance with a further possible embodiment, not represented in the figures, a motor 61 can be present for each feeding device 4. In such case, the transmission means 93 might not be present/necessary.

The forming device 100 further comprises handling means 7 integral with the fixed structure 8 and configured to translate the equipment piece 9.

Said handling means 7 comprise at least one motor 71, at least one transmission element 72 and guiding elements 73.

Figure 3:
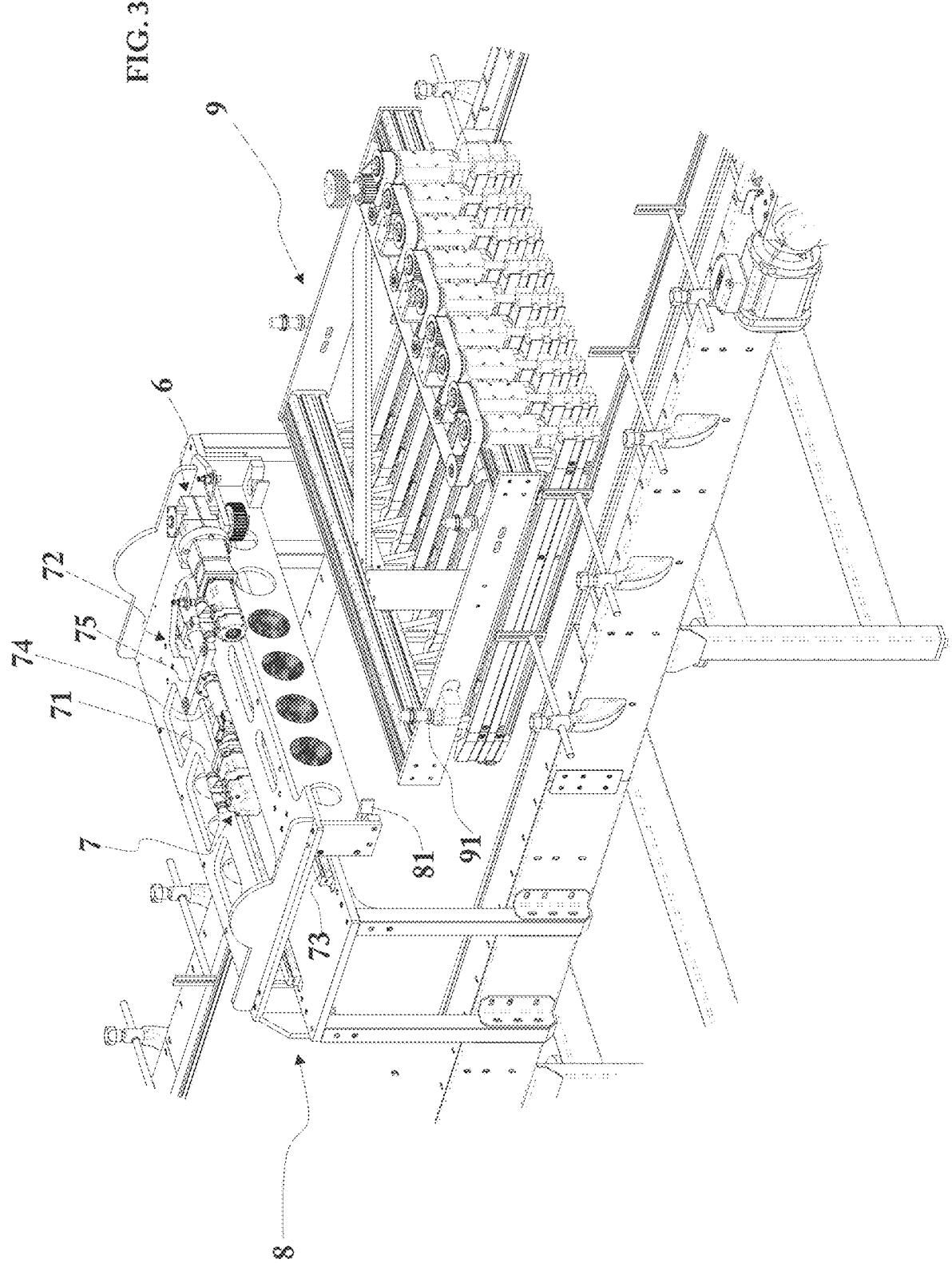
FIG. 3: illustrates, in top view, the forming device for forming a layer of containers arranged as a quincunx with equipment piece movable in a size change position.

According to a preferred embodiment represented in FIGS. 2 and 3, the transmission element 72 comprises a screw 74 and a nut screw 75 which transform the rotation movement of the motor 71 into translating movement.

Due to this configuration, it is possible to manage the movement of the equipment piece 9 as a function of the size of the container 300 to be processed, i.e. by varying the distance D between the positions A and B. The screw 74 must be sized sufficiently long to allow working from the minimum diameter to the maximum diameter of the container 300.

In accordance with one characteristic of the present invention, the motors 71 and 61 are preferably motors of brushless type.

In such a manner, it is possible to work at high velocities capable of ensuring maximum speeds/frequencies.

The forming device 100 further comprises a programmable control unit configured to manage the motors 71 and 61 in a correlated manner.

In accordance with one characteristic of the present invention the equipment piece 9 is removably connected to the structure 8 by means of centering and quick coupling means 91 mechanically associated with shaped portions 81 of the structure 8. This fastening allows a quick mounting and dismounting of the equipment piece 9 and consequently of the devices integral therewith, such as partitions 2 and feeding devices 4.

The equipment piece 9 must in fact be substituted with the variation of the size/diameter of the container 300 and/or with the variation of the configuration of the layer 200, i.e. of the number of rows present in the layer 200 to be formed.

Indeed, the width of the channels and hence the number and the position of the partitions 2 must be different; similarly, the number of feeding devices 4 and the shape of the pockets 5 that must enclose the new container 300 will vary.

Hence, when the line must work a new container 300, it is necessary to perform the size change.

In one formulation of the present invention, said size change provides for:

- releasing the equipment piece 9 from the structure 8,
- setting the equipment piece 9 on the conveyor belt 1,
- translating the equipment piece 9 outside the structure 8,
- picking up the equipment piece 9,
- setting the new equipment piece 9 for the new container 300 on the table,
- translating the equipment piece 9, into position, below the structure 8.
- coupling the equipment piece 9 to the structure 8, inserting the centering and quick coupling means 91 in the shaped portions 81.
- by means of control unit, setting the new size and consequently communicating the new positions A and B to the motor 71.

At this point, the forming device 100 is ready to work according to the above-described cycle.

The containers 300 coming from a feed line are made to advance on the conveyor belt 1 and are inserted between the partitions 2 of the equipment piece 9, forming rows that fill the channels 3.

In one formulation of the present invention, at least one sensor verifies the presence in all the channels of a certain number of containers 300, and provides a signal to the control unit that drives the motor 71. Said motor 71 moves the equipment piece 9, bringing it into the position A.

Once the first position A has been reached, all the feeding devices 4 rotate by one pitch, allowing a container 300 to exit from the corresponding channel 3.

In order to speed up the operating cycle, the motor 61, which drives the feeding devices 4, can start to make them rotate even before the position A is reached. For such purpose, it is provided that the motors 61 and 71 are synchronized in a manner such to ensure the exit of the container 300 only upon reaching said position A.

It must be specified that the positions A and B are to be considered with a possible error, on the order of tenths of a millimeter, as a function of the precision of the electronic detection and drive components.

An electronic counter, e.g. an encoder, preferably on the motor 61, verifies that rotation occurred and ensures counting the correct number of containers 300.

In a preferred embodiment, a counter sensor can be added on each channel in order to provide additional control information.

The control unit compares the signal received from the counter sensor with the signal coming from the electronic counter of the motor 61, ensuring the certainty of the correct number of containers 300 exited from the channels 3.

If the two pieces of information are not in accordance with each other, the control unit supplies an alarm signal.

In such a manner, it is possible to know with certainty that a complete layer 200 was formed, without the presence of empty spaces due to missing containers 300.

The feeding devices 4 are also shaped such to prevent the passage of possible overturned containers 300. The overturned container 300 in fact remains stuck between the pockets 5 and the partitions 2 of the channel 3, preventing the rotation of the same feeding device 4 due to the shape of the pockets, which are defined by radial extensions connected to each other in a manner such to confer an essentially star-like shape to the feeding device.

Once a container 300 has exited from each channel, the motor 71 is driven by the control unit and moves the equipment piece 9, bringing it into the position B.

Once said position B has been reached, all the feeding devices 4 rotate by one pitch, allowing a container 300 to exit from the corresponding channel 3.

The cycle starts again and continues in an equivalent manner for a number of times equal to the number of containers 300 which compose the longest rows of the layer 200.

In accordance with one characteristic of the present invention, it is possible to manage layers 200 in two possible variants:

1. the even rows and the odd rows contain the same number of containers,
2. the even rows contain one container more than the number of containers of the odd rows or vice versa.

In case 1, the formation of the layer 200 starts with the equipment piece 9 in the position A where all the feeding devices 4 extract a container 300 from the corresponding channel 3, it continues for a number of cycles equal to the number of containers 200 that compose the rows, terminating the formation of the layer 200 with the equipment piece 9 in the position B where all the feeding devices 4 extract a container 300 from the corresponding channel 3. The successive layer starts again with the equipment piece 9 in the position A.

In case 2, instead, the formation of the layer 200 starts with the equipment piece 9 in the position A where all the feeding devices 4 extract a container 300 from the corresponding channel 3, continues for a number of cycles equal to the number of containers 200 that compose the longest rows, terminating the formation of the layer 200 with the equipment piece 9 in the position A where all the feeding devices 4 extract a container 300 from the corresponding channel 3. The successive layer starts again with the equipment piece 9 in the position A.

The forming device 100, due to the fact that each channel 3 is configured to arrange the containers 300 of two adjacent rows, will have an equipment piece 9 in which the number of channels 3 is lower than the number of rows which compose the layer 200.

Due to this characteristic, the equipment piece 9 has limited size and weight, facilitating the substitution for size change.

In particular, if there are an even number of rows that compose the layer 200, the number of channels 3 will preferably be equal to half of the rows the compose the layer 200.

If there an odd number of rows that compose the layer 200, the number of channels 3 will preferably be equal to half of the rows that compose the layer 200 plus one.

In addition, if the layer 200 has an odd number of rows, also the work cycle of the forming device 100 is different.

In particular the work device preferably provides that the feeding device 4 associated with one of the two outer channels 3 releases the container 300 only when the equipment piece 9 is in the position A or B closer to the center of the conveyor belt 1, while it locks the container 300 when it is in the position A or B further away from the center of the conveyor belt 1.

In such case, the feeding device 4 associated with said outer channel 3 will have handling means 6 and connection elements 92 that are independent with respect to the remaining channels 3.

In summary, according to the present invention, the method for forming a layer 200 of containers 300 arranged as a quincunx provides for making the containers 300 advance on a conveyor belt 1 according to direction X, dividing them into a plurality of channels 3 parallel to each other and to the direction X.

Each channel contains a row of containers 300.

The channels 3 translate in a reciprocating manner between the two positions A and B arranged according to direction Y substantially perpendicular to the direction X. A container 300 is allowed to exit from each channel 3 by means of the feeding device when the positions A and B are reached, preventing the exit thereof in the intermediate positions.

The distance D between the two positions A and B is equal to the distance between the axes of two adjacent rows of containers 300 of the layer 200.

When the layer 200 has an odd number of rows, it provides for releasing the container 300 of one of the two outer channels 3, only when the channels 3 are in the position A or B closer to the center of the conveyor belt 1, while it locks said container 300, when the channels 3 are in the position A or B further away from the center of the conveyor belt 1.

It is intended in any case that that described above has exemplifying and non-limiting value, hence possible detail variations made necessary for technical and/or functional reasons are considered to fall within the same protective scope defined by the below-reported claims.

The invention claimed is:

1. A forming device for forming a layer of containers arranged as a quincunx, comprising:
   a conveyor belt configured to advance the containers according to a feeding direction of the conveyor belt,
   an equipment piece bearing a plurality of partitions positioned parallel to the feeding direction, wherein the plurality of partitions divide an upper surface of the conveyor belt into a plurality of channels, each having such a width as to allow passage of only a single row of the containers,
   wherein the equipment piece further comprises a series of feeding devices configured for dosing and releasing in a controlled manner the containers exiting from the channels, each placed at an outlet of a respective one of the plurality of channels, and the equipment piece translating the rows of the containers by being movable, in a reciprocating manner according to a horizontal direction perpendicular to the feeding direction of the conveyor belt, between a first position and a second position, wherein the first and second positions define a distance equal to a distance between axes of two adjacent rows of the layer.

2. The forming device according to claim 1, wherein each of the feeding device is configured to rotate according to an axis orthogonal to the feeding and the perpendicular directions.

3. The forming device according to claim 2, wherein each of the feeding devices includes a plurality of pockets distributed at a constant pitch on a circumference around the axis of which coincides with the rotation axis, shaped to enclose and retain a container portion, and configured to extract the container from the channel when the each of the feeding devices rotates by one pitch.

4. The forming device according to claim 1, wherein each of the feeding devices is configured to extract a container from each channel when the equipment piece reaches one of the first and second positions.

5. The forming device according to claim 1, wherein, when the layer has an odd number of rows, the feeding device of one of the two outer channels is configured to extract the container only when the equipment piece is in the position closer to a center of the conveyor belt, while locking the container when the equipment piece is in a position further away from the center of the conveyor belt.

6. The forming device according to claim 1, and further comprising a fixed structure placed above the conveyor belt and configured to support first and second handling devices, where the first handling device is configured to set in rotation the feeding devices and the second handling device is configured to translate the equipment piece.

7. The forming device according to claim 6, wherein the second handling device comprises at least one motor, a transmission element and guiding elements.

8. The forming device according to claim 6, wherein the first handling device comprises at least one motor and transmission elements.

9. The forming device according to claim 6, and further comprising a centering and quick coupling device mechanically associated with shaped portions of the structure for removably connecting the equipment piece to the structure.

10. The forming device according to claim 6, wherein the equipment piece further comprises connection elements and transmission elements, wherein the connection elements are configured to receive motion from the transmission elements, when the equipment piece is fastened to the structure, the transmission elements being configured to transmit motion from the connection elements to at least one of the feeding devices.

11. The forming device according to claim 6, and further comprising a programmable control unit configured to manage the first and second handling devices in a correlated manner.

12. A method for forming a layer of containers arranged as a quincunx, comprising:
   providing a forming device, comprising:
      a conveyor belt configured to advance the containers according to a feeding direction of the conveyor belt,
      an equipment piece bearing a plurality of partitions positioned parallel to the feeding direction wherein the plurality of partitions divide an upper surface of the conveyor belt into a plurality of channels, each having such a width as to allow passage of only a single row of the containers,
      wherein the equipment piece further comprises a series of feeding devices configured for dosing and releasing in a controlled manner the containers exiting from the channels, each placed at an outlet of a respective one of the plurality of channels, and the equipment piece translating the rows of the containers by being movable, in a reciprocating manner according to a horizontal direction perpendicular to the feeding direction of the conveyor belt, between a first position and a second position, wherein the first and second positions define a distance equal to a distance between axes of two adjacent rows of the layer,
   advancing the containers on a conveyor belt according to a feeding direction, dividing the containers into a plurality of channels parallel to each other and to the feeding direction, each of the channels containing a row of containers, translating the channels in a reciprocating manner between the first and second positions, extracting one of the containers from each channel when the first and second positions are reached, preventing the exit of the containers from the channels in intermediate positions.

13. The method according to claim 12, and further comprising, when the layer has an odd number of rows, extracting the container of one of two outer channels only when the channels are in the first position or second position closer to the center of the conveyor belt, while locking the container when the channels are in the first position or second position further away from the center of the conveyor belt.

* * * * *